Nov. 3, 1936.   W. P. TAYLOR   2,059,414
CRUMBLESS BREAD KNIFE
Filed Oct. 17, 1935
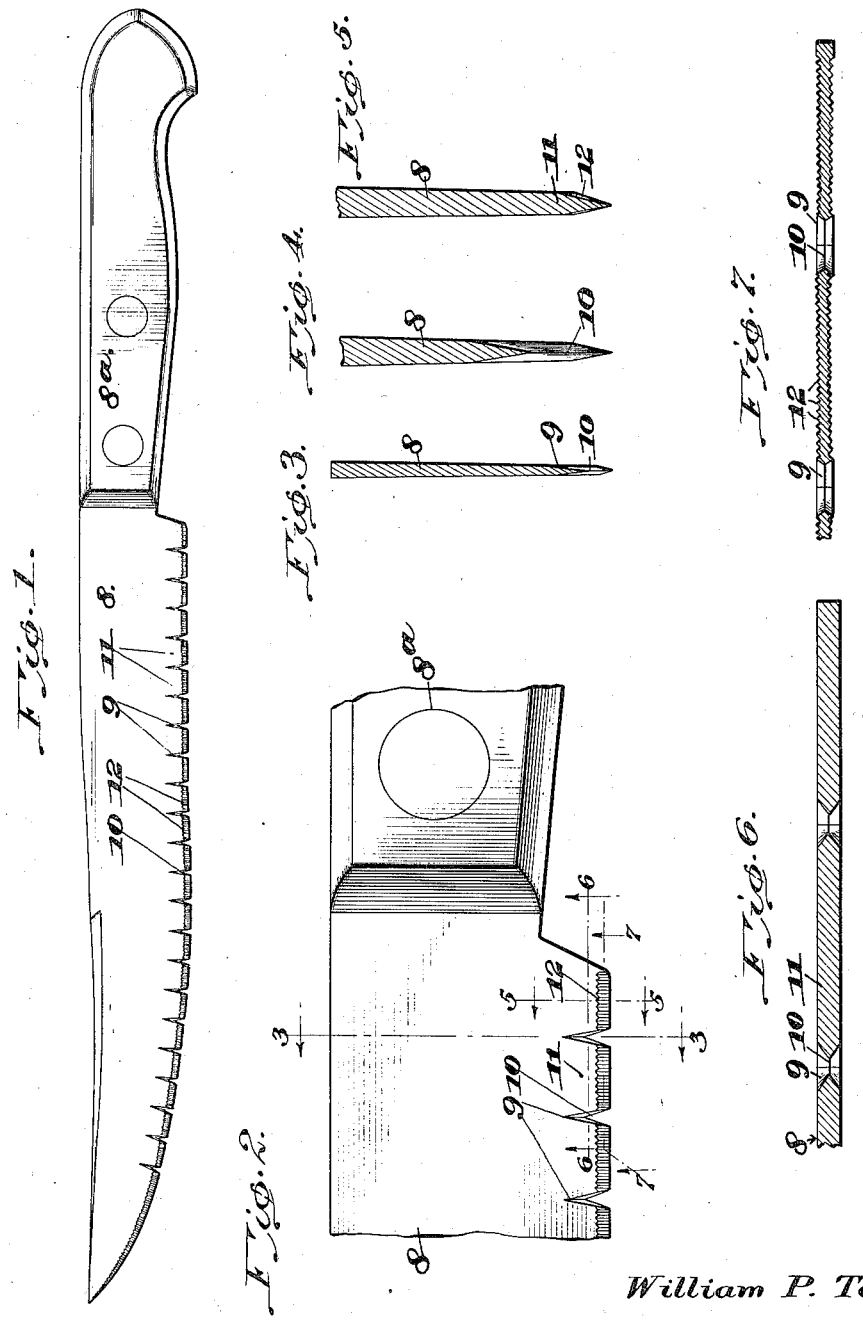
Inventor
William P. Taylor, Patented Nov. 3, 1936

2,059,414

UNITED STATES PATENT OFFICE 2,059,414

CRUMBLESS BREAD KNIFE

William P. Taylor, Colorado Springs, Colo.

Application October 17, 1935, Serial No. 45,488

2 Claims. (Cl. 30—9)

My invention relates to improvements in knives for cutting material such as bread, cake, etc. and it consists in the combinations, constructions, and arrangements herein described and claimed.

There are knives in use at the present time that are particularly designed to cut hot bread, cake, etc. these knives usually being provided with teeth or having the cutting edge in waved form, and while they cut such material much better than a knife with a smooth sharp edge, they tend to force crumbs of the material out at the ends of the cuts.

An object of the present invention is to provide a knife of the type mentioned which will cut freshly baked bread, cake, etc. without forcing crumbs from the material thus cut.

A further object of the invention is to provide a knife of the type described which will stay sharp much longer than the ordinary straight edged knife.

Other objects and advantages will appear in the following specification and the novel features of the invention will be particularly pointed out in the appended claims.

My invention is illustrated in the accompanying drawing forming part of this application, in which:

Figure 1 is a side elevation of a knife constructed in accordance with my invention.

Figure 2 is an enlarged detailed view of a portion of the knife and handle.

Figure 3 is a section along the line 3—3 of Fig. 2.

Figure 4 is a similar section enlarged for the purpose of illustration.

Figure 5 is an enlarged section on the line 5—5 of Fig. 2.

Figure 6 is an enlarged section on the line 6—6 of Fig. 2, and,

Figure 7 is an enlarged section on the line 7—7 of Fig. 2.

In carrying out my invention I provide a blade 8 of any suitable shape, but preferably the shape shown in the drawing. This blade is tapered from the back of the cutting edge as in most knives. At spaced apart intervals are V-shaped slots 9 which extend at right angles to the cutting edge of the knife. In the present instance the end of the knife is shown as being curved and the slots of this curved portion are at right angles to the curved cutting edge, as shown. It will be observed that the edges of these V-shaped slots are bevelled to provide cutting edges 10.

That portion of the blade between adjacent slots 9, indicated by 11, may be called teeth, for purposes of explanation. The teeth, it will be observed, have a sharp front edge, i. e., one edge of the V-shaped slot, and a sharp rear edge as well as a sharp bottom edge.

One of the main features of this invention consists in the provision of corrugations 12 on the sides of the teeth extending inwardly from the cutting edge. These corrugations consist of a plurality of alternate ridges and grooves and as shown in Fig. 5, they are bevelled on their sides to conform to the bevelled edge of the knife when it is sharpened. A handle 8a is provided.

From the foregoing description of the various parts of the device the operation thereof may be readily understood. In cutting freshly baked bread for instance, the cutting edges 10 at the forward and rear ends of the teeth 11 more readily enter the bread or other material than if these V-shaped slots had flat walls. The corrugations 12 tend to separate the bread, but will push the crumbs out to each side so that when the knife goes back and forth in the cutting motion there are no crumbs thrown out, but these will be pressed into the bread, as stated.

The sharpened front and rear edges of the teeth tend to force any crumbs which may have gotten into these slots out of the slots and back into the loaf so that both the corrugations and the knife edges of the V-shaped slots contribute to this result, i. e. of a crumbless bread knife.

The knife is also efficient in cutting meat as well as for cutting bread and cake. The knife edges at the forward and rear ends of the teeth take hold of the meat where the smooth edge of the ordinary knife would not take hold and where a knife having plain edges at the front and rear of the teeth would tear instead of cut.

I am aware that knives having corrugations running from the cutting edge of the knife inwardly on one side has been proposed, but such a knife would not fulfill my purpose since the opposite smooth side of such a knife would not work to press the crumbs back. I have found also that if the grooves are placed at an angle to the perpendicular with respect to the turning edge the device will not cut as well and neither will it cut as well where the slots such as those shown at 9 have parallel edges instead of converging edges, or it will be observed that with the V-shaped slots the cutting edge of each tooth when moved forwardly will tend to slice instead of push because of the converging edges.

I claim:

1. A knife comprising a handle and a blade, said blade having a plurality of spaced apart V- shaped slots extending from the cutting edge of the knife inwardly, the edges of said V-shaped slots being sharpened and the portions between the slots having corrugations extending inwardly from the cutting edge, the length of the corrugations being less than the length of the slots and said corrugations being bevelled toward the cutting edge.

2. A knife comprising a handle and a blade, said blade having a plurality of spaced-apart V-shaped slots extending from the cutting edge of the knife inwardly, the edges of said V-shaped slots being sharpened and the portions between the slots having corrugations extending inwardly from the cutting edge on each side of the blade.

WILLIAM P. TAYLOR.